Aug. 4, 1970  H. R. SCHROEDER  3,522,733
PRESSURE SENSOR
Filed Jan. 27, 1969
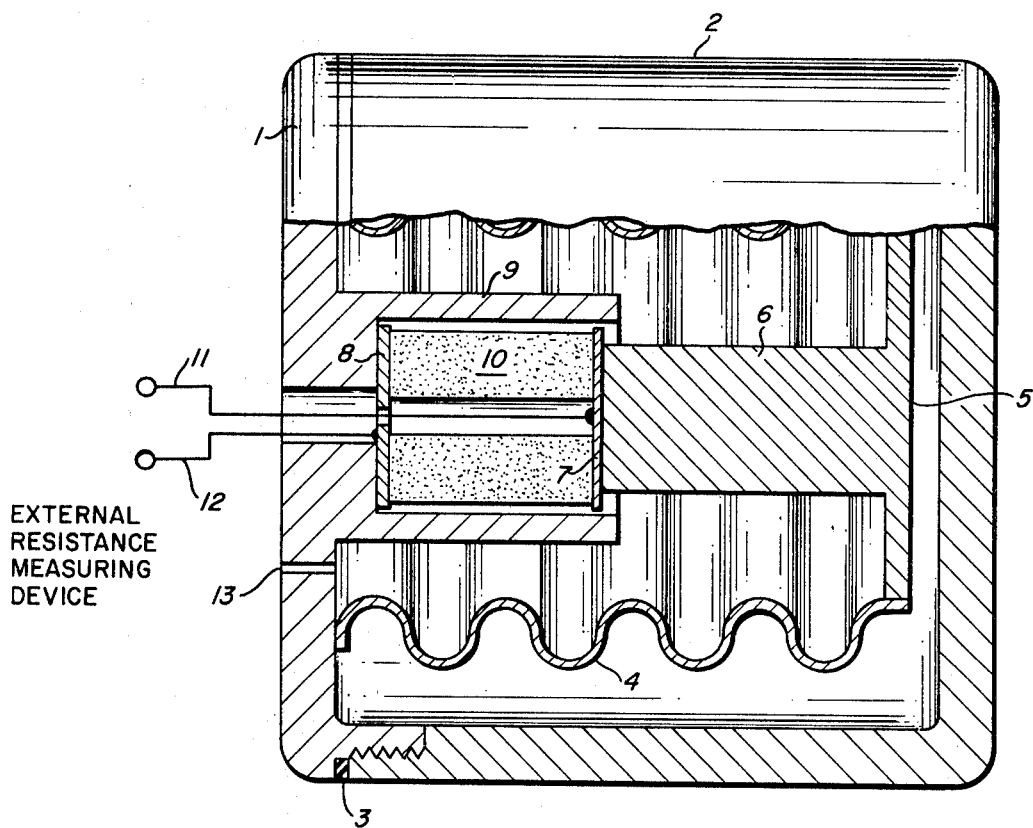
EXTERNAL
RESISTANCE
MEASURING
DEVICE
INVENTOR.
HAROLD R. SCHROEDER
BY
Drummond, Cahill & Phillips
ATTORNEYS

United States Patent Office 3,522,733
Patented Aug. 4, 1970

3,522,733
PRESSURE SENSOR
Harold R. Schroeder, Phoenix, Ariz., assignor to VMC Industries, Inc., a corporation of Delaware
Filed Jan. 27, 1969, Ser. No. 794,052
Int. Cl. G01l 9/02
U.S. Cl. 73—398    3 Claims

ABSTRACT OF THE DISCLOSURE

A pressure sensor utilizing a bellows element is provided in which the sensing element comprises a conductive elastomer variably compressed by the movement of the bellows element with changes in pressure. The characteristics of the conductive elastomer are such that its resistance varies in a known manner as it is variably compressed.

---

Pressure sensors utilizing a bellows element mechanically driving a variable resistance element are well known within the industrial instrumentation art. Typically, the bellows element drives the variable resistance element through a linkage. Thus, the accuracy of such pressure sensors is subject to the vagaries of linkage wear and misadjustment as well as the normal problems associated with a variable resistance element which normally includes at least one one sliding contact.

It is a general object of the present invention to provide an improved pressure sensor.

It is a more specific object of this invention to provide a pressure sensor which obviates the necessity for mechanical linkage disposed between a pressure-to-position element and a position-to-resistance element.

It is another specific object of this invention to provide a pressure sensor in which a bellows element responds to changes in ambient pressure by variably bearing directly upon a pressure sensitive resistance element.

Additional objects of this invention, its advantages, scope, and the manner in which it may be practiced will become more readily apparent to persons conversant with the art from the following detailed description of an exemplary embodiment taken in conjunction with the annexed drawing of which:

The single figure is a partial cutaway view of an exemplary pressure sensor incorporating the concepts of the present invention.

Referring now to the single figure, it will be observed that the pressure sensor is enclosed within a housing comprising a base 1 and a cap 2. The cap 2 may be fitted to the base 1 by threading the two together or by any other convenient means. A seal 3 may be utilized to insure a gas-tight fit.

A conventional bellows element 4 is secured and sealed at one end to the housing base 1. The free end of the bellows element 4 is sealed with an end piece 5. The center portion 6 of the end piece 5 extends axially into the interior of the bellows element 4 and bears against a conductive plate 7. A second conductive plate 8 rests on the base 1 within a cylindrical cavity formed by the tubular extension 9 from base 1.

A cylindrical conductive elastomer element 10 is compressed between the conductive plates 7 and 8. A conductive elastomer which has been found to be satisfactory for use in the present invention is that manufactured under the trademark "Conductomer" by the Sensotec Division of Scientific Advances, Incorporated. The characteristics of this conductive elastomer are such that the resistance measured across the elastomer mass decreases as the compressive force increases. It may be further noted that, with a decrease in the compressive force, the inherent elasticity in the conductive elastomer serves to effect expansion of the elastomer mass, and a consequent increase in resistance, in accordance with the newly established pressure. Therefore, it will be understood that, with the characteristic response of the cylindrical mass of conductive elastomer predetermined, the pressure exerted by the conductive plates 7 and 8 across the conductive elastomer element 10 is accurately reflected by the measured resistance between the conductive plates 7 and 8. The conductors 11 and 12, connected to the conductive plates 7 and 8 respectively, provide an indication to any suitable external resistance measuring device of the resistance across the conductive plates 7 and 8 and hence the pressure exerted by the bellows element 4 on the conductive elastomer element 10.

To expose the inside of the bellows element 4 to the ambient pressure, an aperture 13 passes through the base 1 and opens into the inner chamber. It will be understood, of course, that it might be preferable in some applications to maintain the interior of the bellows element 4 at a reference pressure, in which case the aperture 13 would be repositioned such that the exterior of the bellows element 4 would be exposed to the ambient pressure.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles. The appended claims are therefore intended to cover and embrace any such modifications, within the limits only of the true spirit and scope of the invention.

I claim:
1. An ambient pressure sensor comprising:
   (a) a bellows element including a free end movable in accordance with changes in the pressure differential appearing between the inner side and the outer side of said bellows element;
   (b) means for exposing one side of said bellows element to a fluid maintained at a reference pressure;
   (c) means constraining a fixed end of said bellows element in a reference position, first and second conductive plates within the bellows element; and
   (d) a variable resistance element comprising a conductive elastomer compressed between said first and second conductive plates,
      (1) means for maintaining said first conductive plate in fixed spatial relationship with said fixed end of said bellows element, and
      (2) means for maintaining said second conductive plate in a spatial relationship to the first conductive plate proportional to the movement of said free end.

2. The ambient pressure sensor of claim 1 in which the outer side of said bellows element is exposed to the fluid maintained at the reference pressure.

3. The ambient pressure sensor of claim 2 which further comprises: a housing enveloping said bellows element and cooperating with the outer side of said bellows element to form a chamber for containing the fluid maintained at the reference pressure, and an aperture in said housing adapted to expose the inner side of said bellows element to the ambient pressure.

References Cited

UNITED STATES PATENTS 2,472,214   6/1949   Hurvitz _____ 73—398 XR
2,901,718   8/1959   Rehnborg et al. _____ 338—41

DONALD O. WOODIEL, Primary Examiner

UNITED STATES PATENT OFFICE
CERTIFICATE OF CORRECTION

Patent No. 3,522,733                                     August 4, 1970

Harold R. Schroeder

It is certified that error appears in the above identified patent and that said Letters Patent are hereby corrected as shown below:

In the heading to the printed specification, line 3, "VMC Industries, Inc." should read -- UMC Industries, Inc. --.

Signed and sealed this 2nd day of March 1971.

(SEAL)
Attest:

Edward M. Fletcher, Jr.                            WILLIAM E. SCHUYLER, JR.
Attesting Officer                                        Commissioner of Patents